Patented Mar. 19, 1946

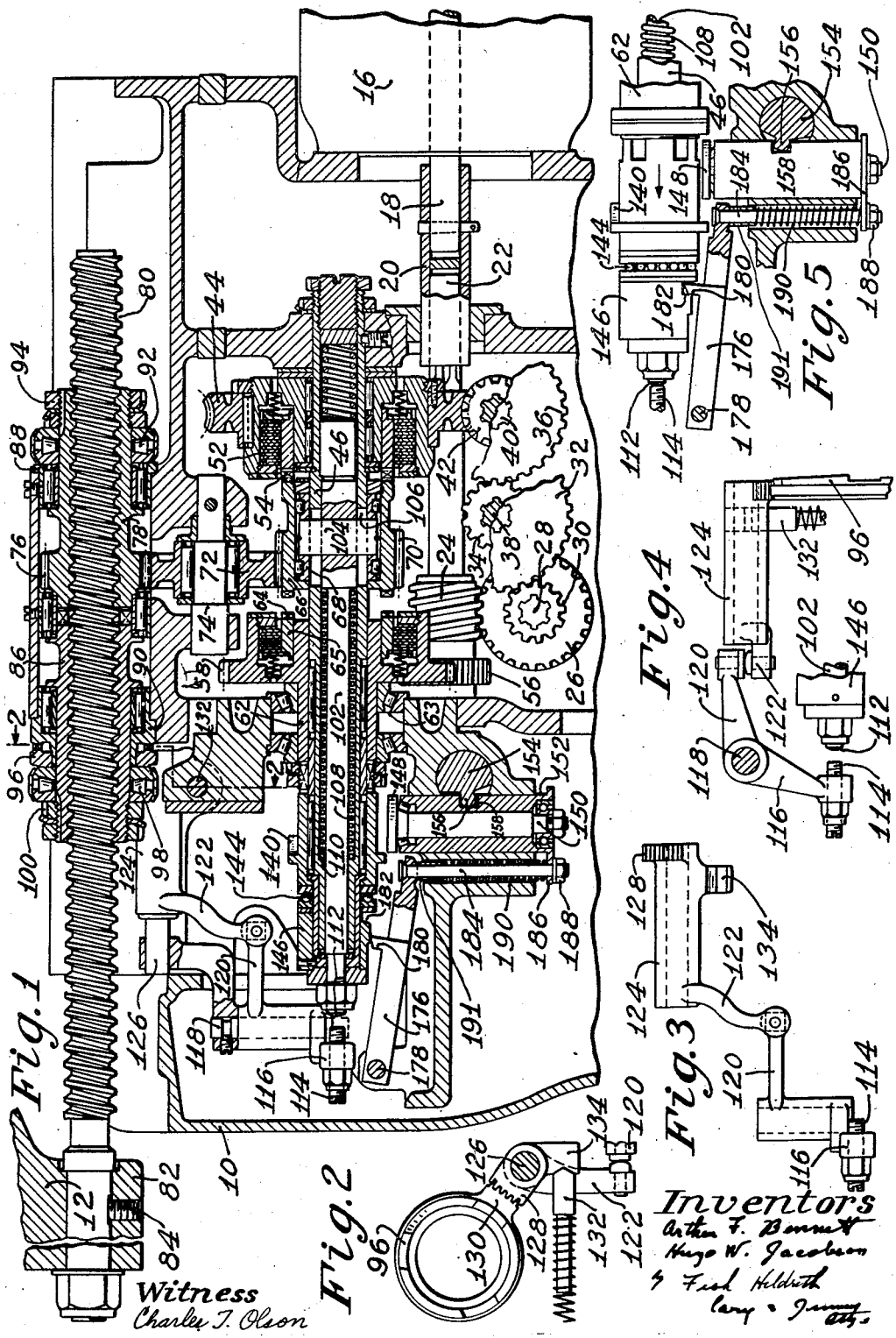

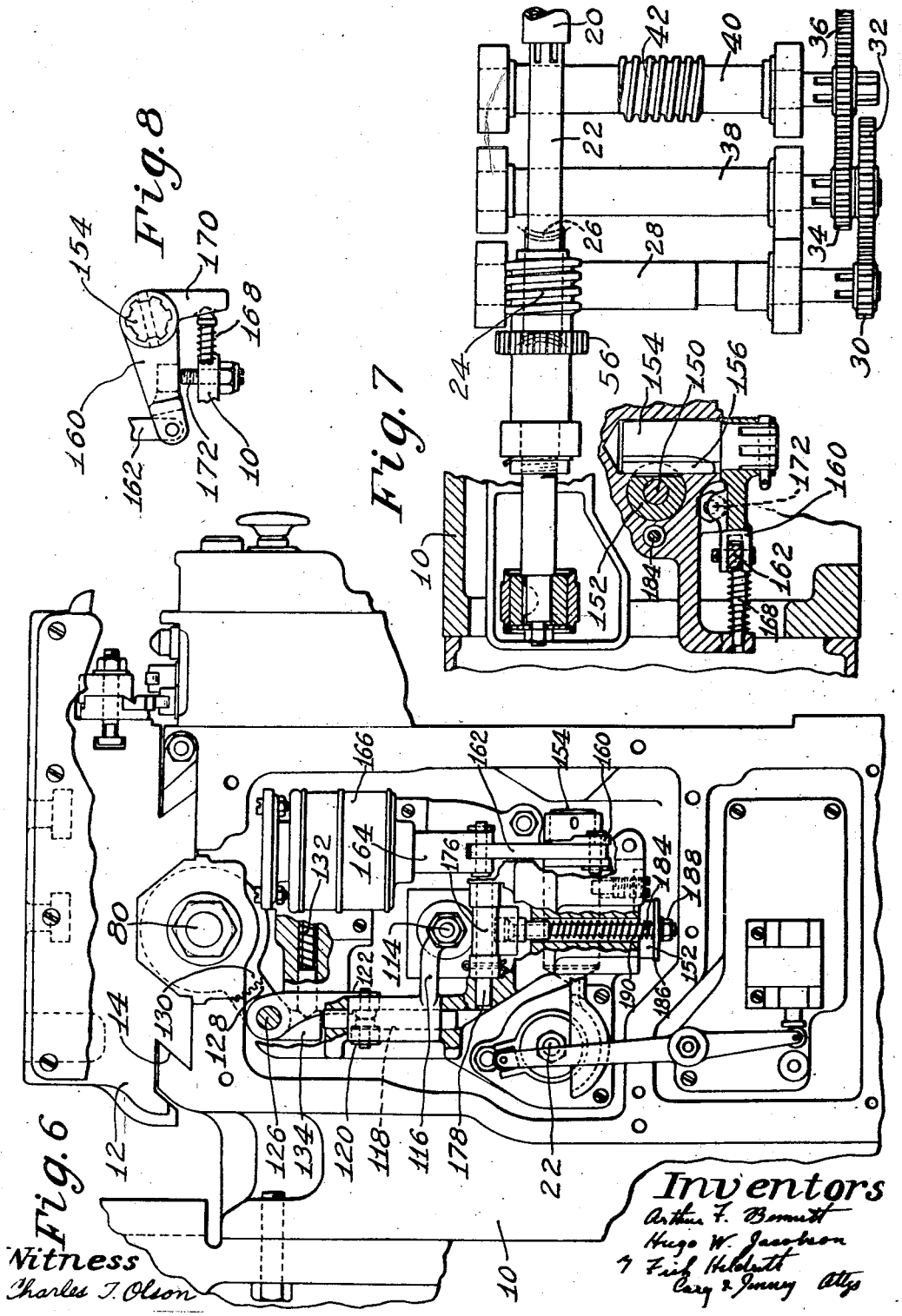

2,396,632

UNITED STATES PATENT OFFICE 2,396,632

DRIVING AND CONTROL MECHANISM

Arthur F. Bennett, West Barrington, and Hugo W. Jacobson, Providence, R. I., assignors to Brown and Sharpe Manufacturing Company, a corporation of Rhode Island Application June 22, 1942, Serial No. 447,930

8 Claims. (Cl. 90—22)

The present invention relates to improvements in machine tools, and more specifically to the improvements in a driving and control mechanism for a movable support in that class of tools which include a support mounted on ways for movement to effect a relative feed and return movement of the work and operating tool.

The invention is herein disclosed as embodied in a milling machine of the general type illustrated, for example, in the patent to Graves and Bennett No. 2,077,408, and which comprises a rotary milling cutter vertically adjustable on a supporting column, and a reciprocable work support or table which is driven from a reversible electric motor through connections which include cooperating feed screw and nut driving elements, slow feed and quick traverse clutch connections, a take-up device having a take-up action to maintain a tight working engagement between the feed screw and nut elements, and means to ease off the take-up device during operation of the table at the traverse rate.

It is a principal object of the invention to provide a novel and improved control mechanism for shifting the feed-quick traverse clutch from feed to quick traverse position, and for simultaneously easing off the take-up device.

With this and other objects in view as may hereinafter appear, a principal feature of the invention consists in the provision of a simplified and improved arrangement of the mechanism for shifting the feed-quick traverse clutch which includes a rotatable cam connected for axial movement to shift the clutch from feed to quick traverse position and to ease off the take-up device, a follower which is shifted by means of a solenoid into and out of operative engagement with the cam to shift the same, and a latching device which is rendered operative by movement of the follower into engagement with the cam to engage with and latch the clutch and ease-off device in their shifted position, and by a retracting movement of the follower to permit the return of the clutch and take-up device to the feed position.

The features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a detail sectional view in front elevation illustrating particularly the table driving connections in the base of a milling machine, only so much of the machine having been disclosed as is believed necessary to illustrate the connection of the present invention therewith; Fig. 2 is a detail sectional view taken on the line 2—2 of Fig. 1, to illustrate particularly the mechanism for easing off the backlash take-up device; Fig. 3 is a detail view of the operating connections for the ease-off device illustrated generally in Fig. 1; Fig. 4 is a plan view of the parts shown in Fig. 3; Fig. 5 is a detail view of the clutch shifting mechanism shown in Fig. 1, but with the clutch shifting plunger raised into engagement with the shifting cam, and with the parts latched in the quick traverse position; Fig. 6 is a view of the base portion of the machine in left side elevation, the end plate of the base having been removed and certain parts shown in section for clarity of illustration; Fig. 7 is a fragmentary plan view partly in section, illustrating particularly the variable speed feed driving connections to the table, and portions of applicants' clutch shifting mechanism; and Fig. 8 is a detail view in front elevation, illustrating particularly the spring means for shifting the clutch shifting plunger to its inactive position and for removing the latch to permit the return of the feed-quick traverse clutch to the feed position.

The invention is disclosed in the drawings as embodied in a milling machine having a base 10 and a work supporting table 12 which is supported for sliding movement on ways 14 on the base 10. The table is arranged to be power operated from a reversible electric motor 16 which is mounted on the base and operates through appropriate feed and quick traverse driving connections including a feed-quick traverse clutch to drive the nut element of a feed screw and nut driving connection for traversing the table. The armature shaft 18 of the motor is connected by means of a sleeve coupling 20 with a main drive shaft 22. The table is driven from the shaft 22 at a feed rate through a feed driving train comprising a worm 24 on the shaft 22 which meshes with a worm wheel 26 on a forwardly extending countershaft 28. Thence the drive is taken by means of a pick-off gear 30 on the shaft 28, pick-off gears 32 and 34 on a countershaft 38 and a pick-off gear 36 on a driven shaft 40, to a worm 42 on the shaft 40, and a worm wheel 44 which forms the feed driving element of the feed-quick traverse clutch. The worm wheel 44 is supported on and is keyed to one element of an overload friction clutch unit 52 which is supported on roller bearings on a supporting shaft 46, and carries thereon a clutch face 54 forming the feed driving element of the feed-quick traverse clutch.

For operation of the work table at a quick traverse rate, the drive is taken from the drive shaft 22 through a quick traverse gear train comprising a gear 56 on the shaft 22 and a gear 58 which is supported to turn on the supporting shaft 46 and forms the quick traverse driving element of the feed quick traverse clutch. The gear 58 is formed integrally with a sleeve element 62 which is loose on the shaft 46 and is externally supported by means of roller bearings 63 carried on the base 10. In order to provide for an overload safety release in the quick traverse driving connections, the clutch face 64 of the quick traverse driving element is formed on a sleeve member 65 which is connected through a multiple disk friction clutch to turn with the quick traverse gear 58.

The driven element of the feed-quick traverse clutch comprises a sleeve clutch member 66 interposed between the feed and quick traverse driving clutch faces 54 and 64 respectively, and arranged to be shifted axially into clutching engagement with one or the other of said clutch faces 54 and 64. The sleeve member 66 is supported to rotate with relation to and to move axially with a sleeve element 68 which is slidably supported on and keyed to the supporting shaft 46. A spiral gear 70 formed on the external periphery of the driven sleeve clutch element 66 meshes with an idler gear 72 on a stub shaft 74, the idler 72 in turn meshing with a spiral gear 76 formed on a driving nut element 78 screw-threaded to a feed screw 80 for driving the table. The feed screw and nut driving connection of the present machine is of the general type in which the feed screw 80 is supported at one end in a depending lug 82 on the table to move axially therewith, and is further supported against rotational movement therein by a locking screw 84. The nut 78 is connected by means of meshing clutch teeth with a second nut 86 on the feed screw 80. The nuts 78 and 86 are supported against axial movement on the base 10 by means of two end thrust surfaces 88 and 90, the surface 88 being engaged by a roller bearing 92 which is seated against a check nut 94 on the nut 78. The end thrust surface 90 has formed thereon cam surfaces which cooperate with corresponding surfaces formed on a ring-shaped backlash take-up cam 96, the cam in turn being engaged by a roller bearing 98 which engages against a check nut 100 on the sleeve nut 86.

With the present construction, a novel and improved operating mechanism is provided for shifting the feed-quick traverse clutch to the quick traverse position, and simultaneously for easing off the take-up device for eliminating backlash in the feed screw and nut driving connection for the work supporting table 12. The clutch shifting mechanism comprises specifically a control rod 102 which extends axially within the hollow supporting shaft 46, and is connected by means of a key 104 with the sleeve element 68 for controlling the lengthwise position of the driven element of the feed-quick traverse clutch. The key 104 extends through a slot 106 in the supporting shaft 46. A compression spring 108 coiled about the control rod 102 between a shoulder 110 formed on the inner periphery of the supporting shaft 46 and the shouldered end of an enlarged portion of the shift rod, tends to move the shift rod 102 toward the right as shown in Fig. 1, to maintain the feed-quick traverse clutch normally in its feed position.

At its left hand end the shift rod 102 projects from the supporting shaft 46, and is provided with an abutting surface 112 for engagement with an adjustable stop screw 114 on a lever arm 116 forming part of the mechanism for easing off the take-up device for eliminating backlash in the feed screw and nut connection. The arm 116 is secured to a vertically disposed rock shaft 118 which carries adjacent its upper end an arm 120 connected with an arm 122 having a sleeve hub 124 fitted to turn on a horizontally disposed pivot shaft 126. A gear toothed sector 128 on the sleeve hub 124 is arranged for operative engagement with a toothed sector 130 formed on the backlash cam 96. The construction and arrangement of these connections is such that movement of the control rod 102 to the left will act to shift the feed-quick traverse clutch to the quick traverse position, and at the same time through the engagement of the surface 112 with the stop screw 114 will act to rock the backlash cam 96 in a counter clockwise direction as viewed in Fig. 2, to ease off the take-up device. A spring-pressed plunger 132 engages against a notched arm 134 on the sleeve hub 124 to maintain the backlash cam 96 normally in its take-up position.

In accordance with a feature of the present invention, applicants provide a novel and improved control mechanism which is power operated for shifting the feed-quick traverse clutch from the feed to the quick traverse position, and simultaneously for easing off the take-up device. This mechanism comprises a rotatable cam connected for axial movement to shift the clutch, a follower element in the form of a plunger which is shifted by means of a solenoid into operative engagement with the cam to shift the same, and a latching device for supporting the cooperating parts in their shifted position. This mechanism comprises specifically a cam 140 having a roller bearing support on the supporting shaft 46. At one end the sleeve hub of the cam 140 is provided with a number of elongated clutch teeth which are maintained in mesh with cooperating teeth on the end of the supporting sleeve 62 for the quick traverse gear 58, so that the cam 140 turns continuously with the quick traverse driving gear 58. At its opposite end the sleeve hub of cam 140 is arranged for abutting engagement with a ball thrust bearing 144 interposed between the cam 140 and a sleeve element 146 pinned to the portion of the control shaft 102 projecting beyond the end of the hollow supporting shaft 46. The cam 140 is arranged to be acted upon by means of a plunger type follower which takes the form of a roll 148 formed on the upper end of a vertical pivot shaft 150 which is rotatably supported in an axially movable plunger sleeve 152. The position of the follower roll 148 and plunger sleeve 152 is controlled by means of a horizontally arranged rock shaft 154 having portions of one side cut away to provide a rib 156 which engages in a transverse slot 158 in the sleeve plunger 152. A horizontally extending lever arm 160 (see Figs. 7 and 8) fitted to the splined outer end of the rock shaft 154 is connected by means of a link 162 with the armature 164 of a solenoid 166. A spring-pressed plunger 168 engaging against a depending arm 170 secured to the rock shaft 154 tends to rock the shaft in a direction to pull the sleeve plunger 152 and follower 148 downwardly to an inoperative position determined by the engagement of an adjustable stop screw 172 with an abutment on the lever arm 160. Figs. 1 and 8 show the parts of the control mechanism above described in the inoperative position in which the table is connected for operation at the feed rate.

The solenoid 166 when energized tends to rock the lever arm 160 and rock shaft 154 against the pressure of the spring plunger 168 to move the follower 148 and sleeve plunger 152 upwardly into operative engagement with the cam 140. Continued rotation of the cam under the influence of the continuously driven traverse driving clutch gear 58 and sleeve 62 acts to shift the cam 140 leftwardly, carrying with it the ball bearing 144, sleeve 146 and control shaft 102, thus causing the driven clutch element 66 of the feed-quick traverse clutch to be shifted into engagement with the quick traverse clutch face 64. At the same time the face 112 on the control rod 102 is brought into engagement with the adjustable screw 114, causing the backlash cam 96 to be rocked in a counterclockwise direction from the position shown in Fig. 2, against the pressure of the spring-pressed plunger 132 to ease off the take-up device.

The control rod 102 is arranged to be latched in its shifted position to maintain the feed-quick traverse clutch in its quick traverse position, and to maintain the take-up device in its eased-off condition by means of a latch 176 which is rendered operative or inoperative concurrently with the movement of the follower into and out of its clutch shifting position in engagement with the cam 140. The latch 176 is pivoted at one end at 178 on the machine frame, and is provided intermediate its ends with an upwardly extending nub 180 arranged for engagement with a notch 182 formed in the under side of the sleeve member 146 when the control rod 102 and associated parts including the sleeve member 146 have been moved leftwardly to the quick traverse position. The latch 176 is connected to be urged upwardly toward its latching position concurrently with movement of the follower 148 and sleeve plunger 152 to the quick traverse position in engagement with the shift cam 140, and is further arranged to be moved downwardly to inoperative position to permit the return of the control rod 102 and associated parts to the feed position concurrently with the downward movement of the follower 148 and sleeve plunger 152 to the retracted feed position. The latch 176 is connected to move with the sleeve plunger 152 by means of a connecting pin 184 which at its upper end extends through an aperture in the latch, and is provided with a large head for engagement therewith. At its lower end the connecting pin passes through an aperture formed in a lateral extension 186 on the lower end of the sleeve plunger 152, being connected therewith by means of a locking nut 188. A compression spring 190 coiled about the connecting pin 184 for engagement between the lateral extension 186 and a sleeve 191 engaging with the latch 176 serves to maintain the latch yieldably in an upwardly extended position with respect to the sleeve plunger 152.

With this construction and arrangement of the latch actuating mechanism, when the solenoid 166 is energized, upward movement of the sleeve plunger 152 and follower 148 into engagement with the shift cam 140 acts to compress the spring 190 and to bias the latch 176 upwardly so that as the shifting control rod 102 and associated parts are moved leftwardly to the quick traverse position, the latch 176 moves upwardly to engage the nub 180 in the notch 182.

When the solenoid 166 is again de-energized, the spring-pressed plunger 168 acting on the arm 70 causes the sleeve plunger 152 and follower 148 to be moved downwardly to inoperative position, and simultaneously to move the nub 180 of the latch 176 positively out of engagement with its notch 182. The control rod 102 is now free to move to the right under the influence of its spring 108 to shift the driven element 66 of the clutch from the quick traverse to the feed position. At the same time, the connections for easing off the take-up device are permitted to move under the influence of the spring-pressed plunger 132 to rock the lever 128 and backlash 96 to reestablish the take-up device in active operation.

The electrical operating conections for the machine including the control circuit for the feed-quick traverse clutch control solenoid 166 are fully illustrated and described in an application for Letters Patent filed of even date herewith by the present applicants and August L. Krause as joint inventors. These electrical connections specifically form no part of the present invention, and therefore have not been illustrated herein.

It will be understood that the invention is not limited to the specific embodiment shown, and that various deviations may be made therefrom without departing from the spirit and scope of the appended claims.

What is claimed is:

1. In a machine tool having a movable support, and driving means for the support including a feed-quick traverse clutch having clutching devices shiftable between feed and quick traverse positions, the combination of a clutch control mechanism comprising a continuously actuated shift cam and a follower arranged for engagement therewith to shift the clutch from feed to quick traverse position, yieldable means for maintaining the clutch normally in feed position, means for moving the follower between inoperative and cam engaging positions to cause the clutching devices to be shifted to and from the quick traverse position which comprises spring means for moving the follower yieldingly to one position and a solenoid acting when energized to move the follower to the other position, a latching device arranged when rendered operative to latch the clutching devices in a quick traverse position, and a connection between the latch and follower responsive to movement of the follower into cam engagement to engage the latch and responsive to a withdrawal of the follower to release the latch.

2. In a machine tool having a movable support, and driving means for the support including a feed-quick traverse clutch having clutching devices shiftable between feed and quick traverse positions, the combination of a clutch control mechanism comprising a continuously actuated shift cam and a follower arranged for engagement therewith to shift the clutch from feed to quick traverse position, yieldable means for maintaining the clutch normally in the feed position, yieldable means tending normally to maintain the follower out of engagement with the cam, a solenoid arranged for moving the follower into engagement with the cam to shift the clutch to the quick traverse position, and a latching device for latching the clutch in quick traverse position connected with said follower to be shifted to latching position upon movement of the follower into engagement with the cam and to be shifted to inoperative position to release the clutch upon movement of the follower out of engagement with the cam.

3. In a machine tool having a movable support, and driving means for the support including power means and a feed-quick traverse clutch including power actuated feed and quick traverse driving elements, and a driven clutch element interposed therebetween shiftable between feed and quick traverse positions, the combination of clutch control means including a rotatable and axially movable cam, means connecting the cam for movement axially with the driven clutch element, a power actuated connection for continuously rotating the cam, yieldable means for maintaining the cam and clutch normally in the feed position, a follower element shiftable into engagement with the cam and rendered operative by rotational movement of the cam to shift the cam and driven clutch element to quick traverse position, a latch arranged when rendered operative to latch the cam and clutch driven element in the quick traverse position, a connection between the latch and follower responsive to movement of the follower into cam engagement to engage the latch and responsive to a withdrawal of the follower to release the latch, spring means for shifting the follower to its inoperative position, and a solenoid for moving the follower into cam engaging position.

4. In a machine tool having a movable support, driving means for the support including power means and a feed-quick traverse clutch including power actuated feed and quick traverse driving elements, and a driven clutch element interposed therebetween and shiftable between feed and quick traverse positions, the combination of a hollow shaft on which said clutch and driving elements are mounted to turn, an axially shiftable clutch control mounted within said hollow shaft and operatively connected with the driven clutch element, spring means acting to shift the control rod and clutch to the feed position, a clutch shift cam loosely supported to turn on said hollow shaft and connected for movement axially with the shift rod, means connecting the cam to be continuously driven from one of said feed and quick traverse driving elements, a plunger shiftable into engagement with the cam to cause the control rod and clutch to be shifted to quick traverse position, a device operative to maintain the clutch in the quick traverse position, spring means for maintaining the plunger in a retracted inoperative position, and a solenoid for shifting the plunger into cam engaging position and for operating said device.

5. In a machine tool having a movable support, cooperating feed screw and nut elements for moving said support, a take-up device having a take-up action to maintain a tight working engagement between the feed screw and nut elements, means to ease off said take-up device and permit a free operating engagement between the feed screw and nut elements, and driving connections for relatively rotating the feed screw and nut elements to drive the movable support including a feed-quick traverse clutch having clutching devices shiftable between feed and quick traverse positions, the combination of a clutch control mechanism comprising a continuously actuated shift cam and a follower arranged for engagement therewith to shift the clutch from feed to quick traverse position and simultaneously to render the ease-off means operative to ease off the take-up device, yieldable means for maintaining the clutch normally in the feed position and the take-up device in the take-up position, means for moving the follower between inoperative and cam engaging positions to cause the clutching devices to be shifted to and from the quick traverse position and the ease-off means to be rendered operative and inoperative which comprises spring means for moving the follower yieldably to one of said positions and a solenoid acting when energized to move the follower to the other of said positions, a latch arranged when rendered operative to latch the cam and follower connection in the quick traverse and eased-off position, and a connection between the latch and follower responsive to movement of the follower into cam engagement to engage the latch and responsive to a withdrawal of the follower to release the latch.

6. In a machine tool having a movable support, cooperating feed screw and nut elements for moving said support, a take-up device having a take-up action to maintain a tight working engagement between said feed screw and nut elements, means to ease off said take-up device and permit a free operating engagement between said feed screw and nut elements, and driving connections for relatively rotating said feed screw and nut elements to drive said movable support including power means and a feed-quick traverse clutch having alternative feed and quick traverse positions, the combination of power operated means for controlling said clutch and said ease-off means comprising a rotatable and axially movable cam, power connections for continuously rotating said cam, operating connections responsive to axial movement of the cam for shifting the clutch from feed to quick traverse position and simultaneously for easing off the take-up device, a follower shiftable into engagement with the cam and rendered operative by rotational movement of the cam to move the cam axially to shift the clutch to quick traverse position and to ease off the take-up device, a device operable to maintain said operating connections in their shifted position, and a solenoid for controlling the position of the follower and said device.

7. In a machine tool having a movable support, cooperating feed screw and nut elements for moving said support, a take-up device having a take-up action to maintain a tight working engagement between said feed screw and nut elements, means to ease off said take-up device and permit a free operating engagement between said feed screw and nut elements, and driving connections for relatively rotating said feed screw and nut elements to drive said movable support including power means and a feed and quick traverse clutch having alternative feed and quick traverse positions, the combination of a rotatable and axially movable cam, means responsive to movement of the cam axially for shifting the clutch between feed and quick traverse positions and simultaneously with the shift to quick traverse position for easing off the feed screw and nut elements, spring means for maintaining the cam and clutch normally in the feed position, a follower shiftable into engagement with the cam and rendered operative by the rotational movement of the cam to shift the cam and clutch to the quick traverse position and to ease off the take-up device, a latch operative to maintain the said parts in the shifted position, a solenoid for controlling the position of the follower, and means responsive to a withdrawal of the follower from the cam to release the latch.

8. In a machine tool having a movable support, cooperating feed screw and nut elements for moving said support, a take-up device having a take-up action to maintain a tight working engagement between said feed screw and nut elements, means to ease off said take-up device and permit a free operating engagement between said feed screw and nut elements, and driving connections for relatively rotating said feed screw and nut elements to drive said movable support including power driving means, the combination of feed and quick traverse driving clutch elements, a driven clutch element interposed therebetween shiftable between feed and quick traverse positions, a hollow shaft on which said driving and driven clutch elements are mounted to turn, an axially shiftable clutch control rod supported within said hollow shaft and operatively connected with the driven clutch element, spring means acting to shift the control rod and clutch to the feed position, a power driven rotating cam supported co-axially with said shift rod and connected for movement axially therewith, a plunger shiftable into engagement with the cam to shift the control rod and clutch to quick traverse position, a device shiftable to maintain said operating connections in their shifted position, means rendered operative by the shifting of the control rod to ease off the take-up device, and a solenoid for controlling the position of the plunger and said device.

ARTHUR F. BENNETT.
HUGO W. JACOBSON.